Nov. 5, 1946.　　　　　G. E. HOWARD　　　　　2,410,660
VALVE ACTUATING MECHANISM FOR INTERNAL-COMBUSTION ENGINES
Filed March 3, 1945　　　　4 Sheets-Sheet 1
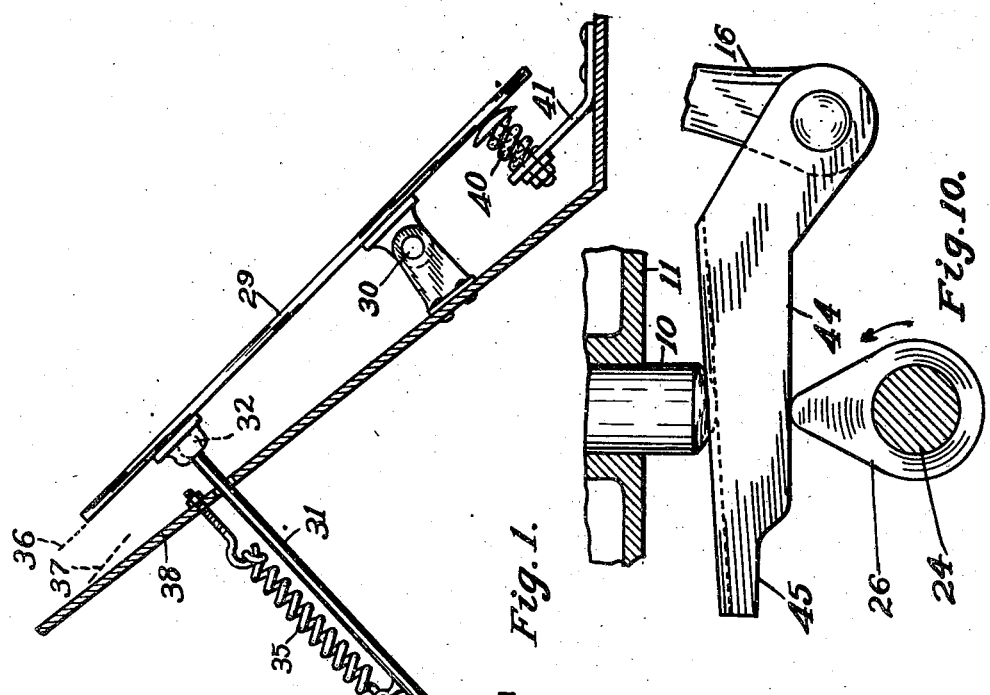
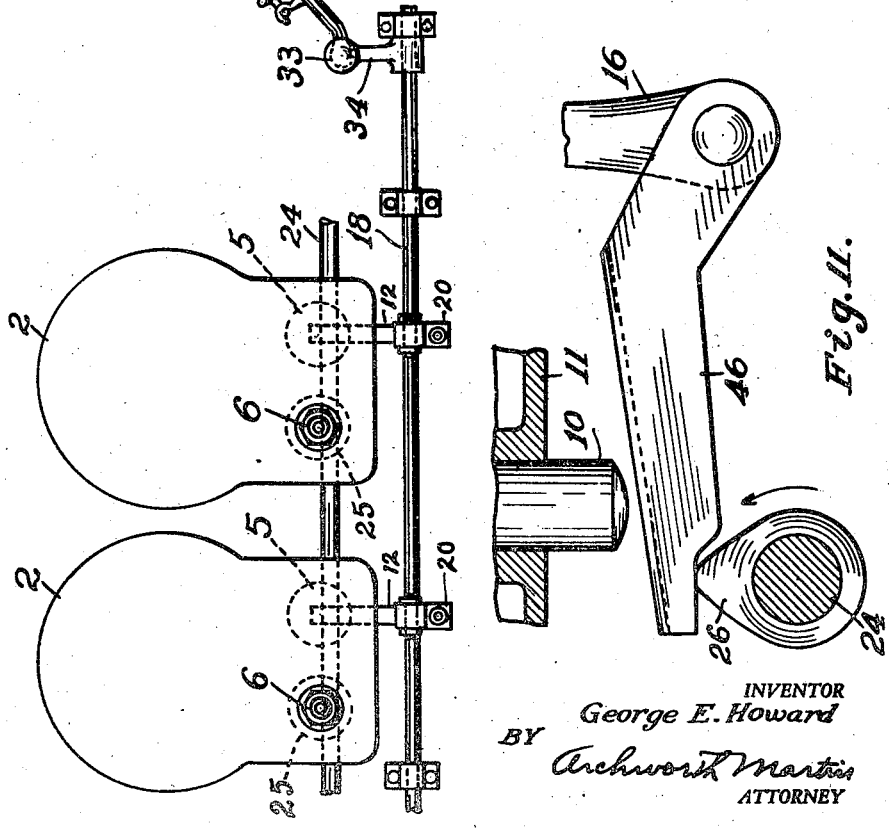
INVENTOR
George E. Howard
BY
Archworth Martin
ATTORNEY Nov. 5, 1946.  G. E. HOWARD  2,410,660

VALVE ACTUATING MECHANISM FOR INTERNAL-COMBUSTION ENGINES

Filed March 3, 1945  4 Sheets-Sheet 2

INVENTOR
George E. Howard
BY
Archworth Martin
ATTORNEY

Nov. 5, 1946.　　　　G. E. HOWARD　　　　2,410,660
VALVE ACTUATING MECHANISM FOR INTERNAL-COMBUSTION ENGINES
Filed March 3, 1945　　　　4 Sheets-Sheet 3

AREA ▓▓▓ = LOSS CUT-OFF SYSTEM

INTAKE INDICATOR CARD ¼ MAXIMUM B.H.P.

INVENTOR.
George E. Howard
BY
ATTORNEY

Nov. 5, 1946.        G. E. HOWARD        2,410,660
VALVE ACTUATING MECHANISM FOR INTERNAL-COMBUSTION ENGINES
Filed March 3, 1945        4 Sheets—Sheet 4

INVENTOR
George E. Howard
BY Archworth Martin
ATTORNEY

Patented Nov. 5, 1946

2,410,660

UNITED STATES PATENT OFFICE 2,410,660

VALVE ACTUATING MECHANISM FOR INTERNAL-COMBUSTION ENGINES

George E. Howard, Butler, Pa.

Application March 3, 1945, Serial No. 580,824

4 Claims. (Cl. 123—90)

My invention relates to internal combustion engines such as those used in driving automobiles, and more particularly to the controlling of the fuel supply to the engine cylinders and the matter of the timing of the movements of the exhaust valves with respect to the movements of the fuel inlet valves. While the invention of this application possesses in itself the various advantages hereinafter recited, it is capable of use also in conjunction with the invention of my application Ser. No. 579,087, filed February 21, 1945, there being somewhat similar economies of operation in the two applications, a greater total economy being secured if the two inventions are both employed in an engine.

Among the objects and advantages of this application are the following:

1. Fuel saving through reduction in engine friction, as by (a) power saving through reduction in negative load or pumping, in drawing in the fuel mixture, (b) reduction of the power required for moving the inlet valve, at light loads, (c) reduction of wear on cylinder walls and bearings, through saving in the power required to introduce the fuel mixture into the engine cylinder.

2. Improvement in the cycle of fuel flow, by providing means to vary the time and extent of the opening of the fuel inlet valve for various loads thereby controlling the overlap in movements of the inlet and exhaust valves, thus reducing adulteration of the fuel mixture by the exhaust gases.

3. Means for tightly cutting off fuel intake during descent of grades, without free wheeling, thereby saving fuel during compression braking.

4. Providing for the equalization of intake of fuel mixture to the various engine cylinders, at all loads, thereby balancing or rendering uniform the power produced in each cylinder.

Certain advantages of this application are common to the objects in my said copending application. For example, the principal concept is that the average automobile requires greater than normal power for acceleration and steep hills. This requirement, of course, determines the size and maximum power of standard automobile engines, but maximum power is required during less than 2% of the time. For 98% of the time, the power required is only 16% of this maximum, and therefore the fuel economy must be attained by greater efficiency at low loads. Any improvement or disadvantage to fuel cost at heavy loads would have a negligible effect on average economy. Again, the fuel and power required to overcome the frictional losses of the engine and its accessories is equal to the amount of fuel and power required for average driving. Since the average power requirements are small as compared to the maximum power of the engine, the savings in the said power losses, although small compared to the maximum power of the engine, result in a greater average gain in fuel economy, with consequent greater increase in miles traveled per gallon.

A further saving arises out of the fact that the starting motor when driven by the battery has to overcome the pumping action required for introducing the fuel mixture into the engine cylinders. By the use of the present invention, this pumping force is less than one-fourth that which is now required, thus giving longer battery life or permitting reduction in the size of the battery, and the starting motor.

In the accompanying drawings, Figure 1 is a schematic view showing the manner in which the fuel inlet valves are controlled by an accelerator pedal; Fig. 2 is an enlarged vertical sectional view showing the manner in which one of the fuel inlet valves of Fig. 1 is mounted and operated; Fig. 3 is a plan view of a portion of the apparatus of Fig. 2; Fig. 4 is a vertical sectional view of a portion of the valve stem and the lifter therefor; Fig. 5 is an indicator diagram of the negative load or resistance to engine movement, caused by the suction or vacuum created through displacement of the engine piston during intake and compression of the fuel; Figs. 6, 7, 8 and 9 are diagrams that show this negative power factor for various loads and conditions, and Figs. 10 and 11 respectively show modifications of the valve-lifting apparatus of Fig. 2.

Only so much of an automobile structure is shown in the drawings as is necessary to an understanding of my invention and the other parts of the vehicle may be of various well known standard forms. Two cylinders of an automobile engine are indicated by the numerals 2, the fuel mixture being supplied thereto, through a manifold or fuel supply line 3 and past poppet valves 5 into combustion spaces 4 where the explosion mixture is ignited by spark plugs 6. A spring 7 of sufficient expansive force to hold the valve seated against the suction within the cylinder is interposed between a guide bushing 8 and a seating block 9 on the valve stem, the valve stem having sliding movement in the bushing 8. The lower end of the valve stem is enlarged as at 10 and is slidable in a guide block or bracket 11 during opening and closing movements of the valve. Exhaust valves are provided as indicated at 25 in Fig. 1, which valves may be of conventional form operated in the usual manner by a conventional cam shaft or by a cam shaft 24.

A lifting element or wedge 12 is movable in a generally horizontal direction beneath the valve stem of each cylinder. These lifting elements are connected to short shafts 13 that are in turn supported by ears 15 on crank arms 16, the parts being held in assembled relation by pins 17. At their upper ends, the arms 16 are rigidly connected to a rock shaft 18 by pins 19, so that when the shaft 18 is rocked, it will shift the lifting elements 12 along the lower end of the valve stem 10 to various other positions, depending upon the time and distance the fuel inlet valve is to be opened. Springs 14 adjustably connected at 20 to the arms 16, and to the levers 12, hold the wedge elements 12 against the cams 26.

The upper side of each valve-lifting element 12 is curved transversely as shown at 21 in Fig. 4 so as to conform to and maintain alinement with the lower curved end of the valve stem 10. The usual cam shaft 24 is provided for operating the inlet valves 5 and exhaust valves 25.

The valve-lifting lever 12 is always resting upon the cam and is cut away at 22 so that when the lever 12 is in its foremost position Y, the camming element 26, when it comes into engagement with this recess at 22, will not raise the lever far enough to open the valve 5. This is a condition which is frequently desirable when descending steep grades, so that the braking effect of the pistons pumping in their cylinders will be secured, without waste of fuel such as would take place if the fuel inlet valves 5 were held open sufficiently for engine idling. The usual throttle valve is not required with the poppet valve operating mechanism just described.

The contours of the wedge at 23 are such that when the lever 12 is at its rearmost position X, as shown in Fig. 2, the cam 26 will raise it to the position shown, at which the valve 5 will be given its maximum opening movement, with consequent suction of a fuel charge into the cylinder 2 during down-stroke of the piston 27. With the lever 12 at position Z of the arm 16, the valve 5 will be raised by the cam 26 only high enough for idling of the engine. Settings at points between Z and X will give various desired times and distances of valve opening. When there is any lift given to the valve at all, it is always started open at a definitely timed relation with respect to a certain portion of the angular travel of the cam 26. It will be thus seen that the amount of fuel charge drawn past the valve 5, will depend upon the position to which the lever 12 has been moved.

The cam surfaces at 23 on the lever 12 are preferably of such contour that the cam 26 may cause the valve 5 to be started from its seat at a slightly earlier stage under light load than at heavy loads, with respect to the suction stroke of the piston. In other words, at light load the valve may preferably be opened slightly sooner with respect to the suction stroke of the piston than under heavy loads, so that there will be adequate fuel drawn into the cylinder at light loads notwithstanding the restricted degree of valve opening at that time.

The distance A (center of valve stem and axis of cam shaft 24) is fixed, and the distance C (from axis of shaft 13 to axis of cam shaft 24) can be reduced, thus increasing the leverage for lifting the valve stem, until the distance B between these two shafts is reached. The changes in lifting leverage are desirable under certain changes in load conditions. For example, a greater lifting leverage as between the wedge 12 and the cam 26 is desirable at low loads than at heavier loads, because the angular distance of contact between the cam and the wedge during lifting is normally less at low loads than at heavier loads. Normally, the shorter time would give lower distance of lift, as the amount of lift usually is proportional to the duration of cam contact. To offset this normally low lift, the lifting leverage is increased by movement from the heavier load (X) to light load (Z) positions so as to provide more adequate opening of the fuel valve 5.

The offsetting of the cam shaft 24 with respect to the axis of the valve stem 10, in conjunction with the use of a lifting lever such as 12 has a further advantage, independently of whether the lever is shiftable or not, in that it permits of a greater range of lifting movement of the valve for a given offset on a cam, thus permitting the use of a cam having a more desirable approach angle.

Since the cam shaft is rotated clockwise on a fixed axis and the wedge cam 12 is shifted counterclockwise, such arrangement in connection with the variation in contour of the wedge cam at 23 provides for varying the starting of the valve lift within limits either earlier or later for different power loads as requirements may change.

Because each cam is separate from the others, it can be so shaped or contoured that the proper gas supply will be provided for each cylinder at all loads and to correct unbalance of cylinders such as results when a number of cylinders are fed from a point not equidistant to all. This invention thus avoids the necessity of a definitely planned firing order of the cylinders to meet unbalance.

By the use of a poppet valve cut-off instead of a throttle and correspondingly less power required, the friction in various ways such as the wear on the cylinder wall, etc., is reduced. As the time and the lift of the intake valve are less for the lighter loads, the power required and the wear on cams, etc., is reduced.

The rock shaft 18 is operated by an accelerator pedal 29 which is pivotally mounted at 30 within an automobile. A link 31 has ball-and-socket connections at 32 and 33 with the pedal 29 and a crank arm 34 on the shaft 18, so that when the pedal is depressed, the shaft will be rocked in a counterclockwise direction (Fig. 2) to shift the valve lifting levers 12 rearwardly toward the position X, the extent to which the cam raises the lever 12 and hence the degree of valve opening and amount of fuel admitted depending, of course, upon the extent to which the pedal is depressed. A spring 35, connected to the floor board 38 and to the link 31, normally urges the pedal in a clockwise direction and thus tends to pull the valve lifting levers 12 to position Z at which the inlet valves will be lifted to admit only idling fuel. Normally, the pedal will be moved only between positions 36 and 37.

A spring 40 is mounted between a fixed seat 41 and the lower end of the pedal. This spring sufficiently resists the action of the spring 38 to prevent complete retraction of the lifting levers 12 to their foremost positions at Y and thus permits of a sufficient fuel supply for idling operation of the engine.

In descending steep hills, when it is desired to use the pumping action within the cylinder as a retarding or braking force, without waste of fuel and with greater effectiveness than if idling fuel were supplied, as is common practice, the driver will press his heel against the lower portion of the pedal with sufficient firmness to compress the spring 40 thus rocking the pedal clockwise a sufficient distance to push the arms 16 to the position Y in Fig. 2 at which point the levers 12 will not be raised high enough to lift the valves 5. As above stated, the springs 7 will hold the valves 5 closed against any suction within the cylinders, so that no fuel will be admitted under the conditions just explained.

Fig. 5 shows an indicator diagram of the negative load or resistance to engine movements, caused by the vacuum or suction created through displacement of the engine piston during fuel intake and the compression thereof, both of which result in reduction or loss of engine power. The diagrams shown in this figure are conventional and well known to the art and therefore need no explanation except as to the differences resulting from the use of my invention.

The shaded portion $a, b, c, d, a$, shows the area of negative power in conventional practice where the supply of fuel mixture is controlled by a throttle valve between carburetor and manifold. The total area shaded represents the negative power lost in conventional operation by throttle. The double shaded area $a, b, e, f, a$, represents the negative power lost for the same fuel intake when this invention is used. Saving is over 90% at this low or average load. After cut-off at $b$, the expansion of charge to $c$, causes a negative pull on the piston, but it is replaced on the compression stroke and follows the same line back to $b$, thus leaving only the small double shaded portion $a, b, e, f, a$, as net negative power.

Figures 6, 7 and 8 show graphically how this invention may advantageously be used in conjunction with my said copending application. Fig. 9 shows the advantage of this invention in conjunction with the standard practice of a fixed compression space.

F represents the compression spaces of standard engines and E the initial compression space used with my copending application.

In all Figures 6, 7, 8 and 9, the negative load referred to in connection with this invention is shown in double-shaded area and the total shaded areas represent the negative load in each instance, when my present invention is not used.

Figure 6:
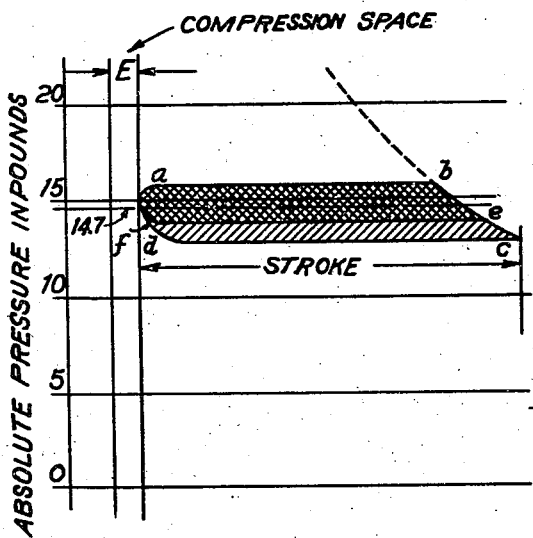
Figures 6, 7, 8 and 9 show the same factor at different loads and under different conditions.

Fig. 6 shows a full power diagram. Here the saving is small, as total shaded area is only about one-third larger than the double shaded area.

Figure 7:
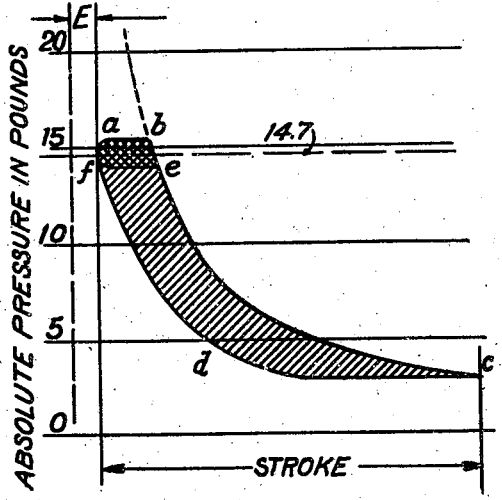
Figure 9:
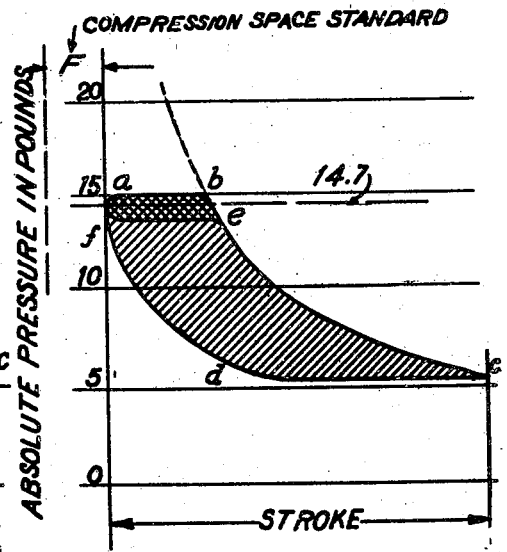

Figure 7 shows an idling diagram using both inventions, and Figure 9 an idling diagram using the present invention with standard compression space F.

Figure 8:
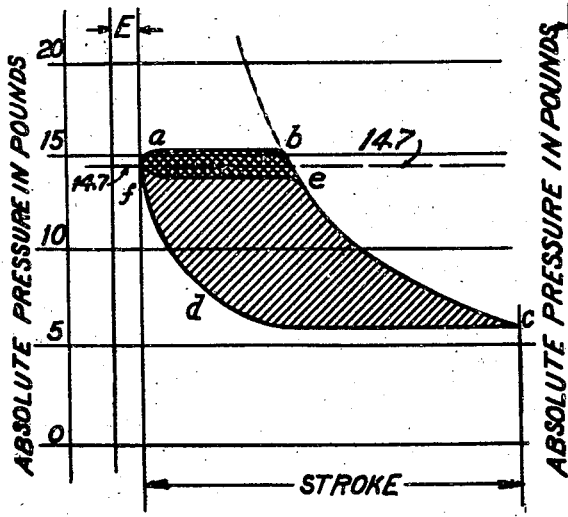

Figure 8 shows an average load diagram, using both inventions.

Comparing Figs. 7 and 9, there is shown a saving in both cases, but the saving is partly due to the use of my copending application as the total negative area is less in 7 than in 9, and this difference shows the gain made by my copending application without the use of this invention.

Figure 5:
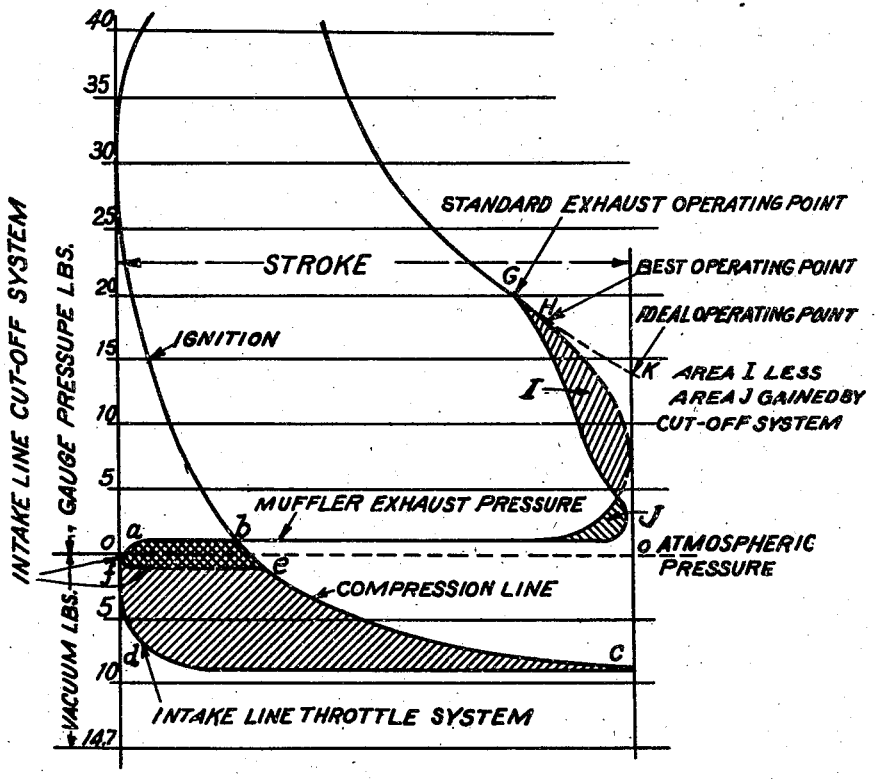

Figure 5 shows an advantage of this invention over standard practice for average loads.

Limitations imposed due to high speeds of revolution make complete exhausting of the burned products of combustion impossible during the exhaust stroke of 180 degrees. In order to get the best compromise result, the exhaust valve is open 244 degrees or 64 degrees more than the entire exhaust stroke and the intake is open the same time or 244 degrees. As a result, the exhaust valve opens usually 57 degrees before the end of the expansion stroke. This point G on Fig. 5 indicates standard, while H is recommended with my invention. At H the gases have expanded further and are lower in temperature; thus power is gained and loss of heat which passes to exhaust reduced.

This reduction of temperature of gases at opening of exhaust valve is important, as the burning of valves is a common occurrence as they operate at present too near the break-down temperature. Any reduction in the working temperature such as by my invention increases the life and gives a margin of safety proportionally greater than the relatively small drop in operating temperature. The change of opening point of exhaust valve from G to H increases power at average loads represented by diagram Fig. 5. Power increase is equal to shaded area I, less shaded area J. The exhaust valve also closes 6 to 7 degrees after the completion of exhaust stroke. Concurrently the intake valve should open before the start of the intake stroke about 9½ degrees. This makes an overlap of about 16 degrees when the intake valve and the adjoining exhaust valve are both open. As exhaust pressure is above atmospheric and intake manifold pressures is sub-atmospheric, exhaust gas passes into the manifold.

At full load the pressure between exhaust and manifold is small, the valve openings are small and the volume of fuel supplied is large. The dilution of fuel charge by exhaust gas is not important. But at the average load, used over 98% of the time, the pressure drop between exhaust and manifold is four times as much, the valve opening the same and the volume of fuel one-third as much, so that the effect of this dilution is twelve times as great. As a result, some modern cars have cut down the overlap by opening the inlet at top center although this means decreased maximum power.

In my invention, the exhaust valve operates in the desired manner and the inlet valve can be opened at any desired point relative to the closing of exhaust, thus giving the best operation at all loads. The overlap may be increased without detrimental results, as the pressure drop between exhaust and inlet pressure is low and substantially even for all loads.

My invention, by reducing the pumping load, saves that power directly. This negative power, plus an equal reduction in the positive power or double the negative power, reduces the friction of the piston on walls, etc., which constitutes about 60% of the engine friction.

Power and wear to parts are saved, as the inlet valves are opened only one-half the distance and against one-half the maximum spring resistance for 98% of the time, saving three-fourths of the wear and power now required all the time. These accumulated savings in the operation of this invention total about 25% of the power required to propel the car.

Figure 2:
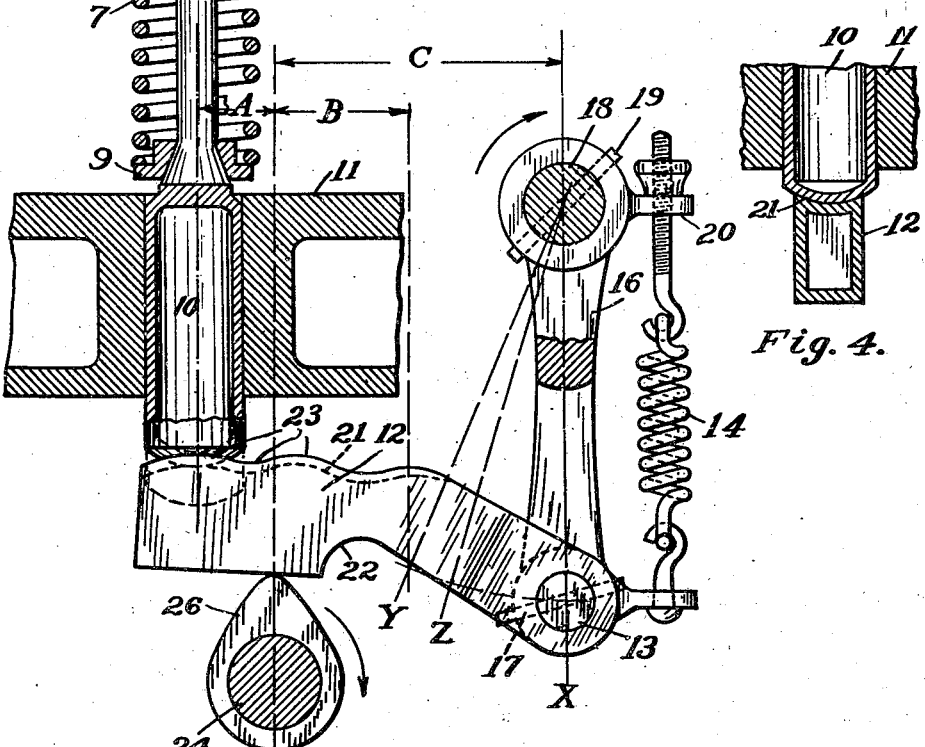
Figure 3:
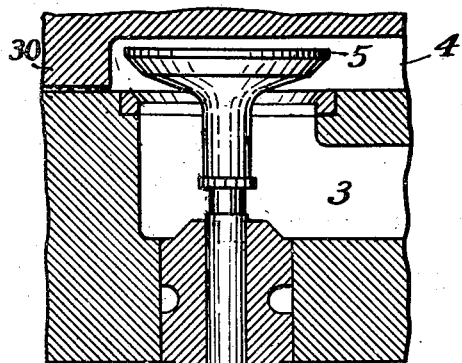
Figure 4:
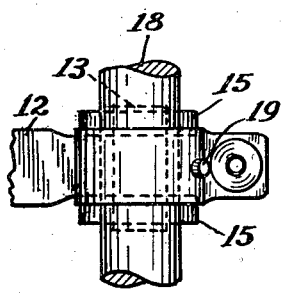

In order to secure the advantages of variable range of lifting of the poppet valve under various load conditions and yet to permit of greater leeway in engine design, as in the case of automobile engines where space is limited, other arrangements of cam and lifting lever can be used than that shown in Fig. 2. For example, as shown in Fig. 10, the center of the cam shaft 24 can be placed in axial alinement with the axis of the valve stem 10. In this case, the contours of the wedge or lifting lever 44 will be somewhat different but will give the desired ranges and duration of valve lifting movement under various load conditions, although it will not have the greater leverage to give increased valve lift relative to the cam offset as in the case in Fig. 2. In this Fig. 10, the lever 44 will be operated by the accelerator pedal or otherwise, but will be drawn rearwardly at reduced loads, and to bring its neutral surface 45 to the cam 26 when the valve 5 is to be held completely closed by its spring.

A similar situation exists with respect to Fig. 11, except the valve lift by the cam 26 and lever 46, for a given cam throw is somewhat less than in either Fig. 2 or Fig. 10, since the axes of the cam shaft and the lever fulcrum are at opposite sides of the valve stem axis. Here too, the wedge 46 will be drawn rearwardly to reduce the valve "lift," or to prevent any opening at all of the valve, by the cam.

While the cam and lifting lever or wedge arrangement is herein described as employed in connection with valves of the poppet type, it will be understood that the invention may be employed with other forms of fuel inlet valves, as for example the sleeve valve engine of my said application.

I claim as my invention:

1. The combination with an internal combustion engine which has a fuel inlet valve, a cylinder with a piston reciprocable therein, and a spring for yieldably holding the valve closed, of a device operable to periodically open the valve, a member movable to normally control the extent to which the valve will be opened by said device, an accelerator pedal for operating said member, and a stop spring for yieldably resisting movement of the pedal in a direction that permits movement of the valve toward its closed position and normally yieldably maintaining the pedal at a point where idling fuel is supplied past the valve, the stop spring being compressible to a degree that will permit the said member to be moved to a point at which the valve will remain closed by its spring.

2. The combination with an internal combustion engine which has a fuel inlet valve, a cylinder with a piston reciprocable therein, and a spring for yieldably holding the valve closed, of a device operable to periodically open the valve, a member reciprocable to control the extent to which the valve will be opened by said device, a manually-movable element for operating said member, the movement of the element in one direction being from a point at which the said member periodically transmits full opening movements to the valve, to a point at which it will normally transmit periodic opening movements thereto sufficient to admit fuel to the cylinder in quantity only for idling, and means normally limiting such movement of the said element to its position at said idling point, but capable of being rendered ineffective to prevent further movement of the element in said one direction.

3. The combination with an internal combustion engine which has a fuel inlet valve, a cylinder with a piston reciprocable therein, and a spring for yieldably holding the valve closed, of a device operable to periodically open the valve, a member reciprocable to control the extent to which the valve will be opened by said device, a manually-movable element for operating said member, the movement of the element in one direction being normally from a point at which the said member periodically transmits full opening movements to the valve, to a point at which it will transmit periodic opening movements thereto sufficient to admit fuel to the cylinder in quantity only for idling, and a spring normally limiting such movement of said element to its position at said idling point, the element being movable farther in said direction, to a point at which the said member is ineffective to open the valve through application of an abnormal force thereto.

4. The combination with an internal combustion engine which has a plurality of cylinders with pistons reciprocable therein and a fuel inlet valve of the poppet type for each cylinder, springs for yieldably holding the valves closed, and cams for opening the valves, a wedge-like lifting element for each valve, a cam shaft having cams respectively engageable with said elements, to periodically effect opening of the valves, a rock shaft having crank arms, links connecting the crank arms to the lifting elements, for shifting said elements longitudinally of their axes, to thereby normally vary the extent to which the valves are opened by the cams, a pivotally-mounted foot pedal having link connection with an arm on the crank shaft, to oscillate the shaft and thereby shift the wedge elements, a spring yieldably holding the pedal in the position at which the lifting elements transmit motion from the cams only sufficient to admit idling fuel to the cylinder, and a spring stop yieldably resisting movement of the pedal past said idling position, to a point at which the lifting elements are withdrawn to their inoperative positions, the said springs being positioned at opposite sides of the pivotal support for the pedal.

GEORGE E. HOWARD.